United States Patent
Gebhard et al.

(10) Patent No.: US 11,422,021 B2
(45) Date of Patent: Aug. 23, 2022

(54) OIL QUANTITY MEASUREMENT APPARATUS AND METHOD

(71) Applicant: Rolls-Royce Corporation, Indianapolis, IN (US)

(72) Inventors: John Gebhard, Fishers, IN (US); Adam Kempers, Indianapolis, IN (US); Jeremy Gallagher, Carmel, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 245 days.

(21) Appl. No.: 16/694,158

(22) Filed: Nov. 25, 2019

(65) Prior Publication Data

US 2021/0156726 A1     May 27, 2021

(51) Int. Cl.
| G01F 23/70 | (2006.01) |
| G01F 23/292 | (2006.01) |
| F01M 11/12 | (2006.01) |
| G01F 23/62 | (2006.01) |

(52) U.S. Cl.
CPC ......... *G01F 23/2921* (2013.01); *F01M 11/12* (2013.01); *G01F 23/62* (2013.01); *F01M 2250/00* (2013.01)

(58) Field of Classification Search
CPC ....................................................... G01F 23/56
See application file for complete search history.

(56) References Cited

U.S. PATENT DOCUMENTS

| 3,389,603 | A | 6/1968 | Jacobs, III |
| 3,417,730 | A | 12/1968 | Colley et al. |
| 4,961,069 | A | 10/1990 | Tsaprazis |
| 4,976,146 | A | 12/1990 | Senghaas et al. |
| 5,103,368 | A | 4/1992 | Hart |
| 5,103,648 | A | 4/1992 | Barbier |
| 6,082,972 | A | 7/2000 | Moore, Jr. et al. |
| 6,363,785 | B1 * | 4/2002 | Senghaas ........... H01H 36/0006 73/313 |
| 6,664,558 | B1 | 12/2003 | Barbier |
| 6,679,286 | B2 | 1/2004 | Kato et al. |
| 7,966,965 | B2 | 6/2011 | Pisseloup |
| 8,401,760 | B2 | 3/2013 | Payne et al. |
| 8,627,667 | B2 | 1/2014 | Lozier et al. |
| 8,674,685 | B2 | 3/2014 | Paradise |
| 9,618,378 | B2 | 4/2017 | Gmirya |
| 9,951,655 | B2 | 4/2018 | Davis et al. |
| 10,393,314 | B2 | 8/2019 | Raimarckers et al. |
| 2002/0108441 | A1 * | 8/2002 | Liu ......................... G01F 23/74 73/305 |

(Continued)

*Primary Examiner* — Paul M. West
*Assistant Examiner* — Mark A Shabman
(74) *Attorney, Agent, or Firm* — Crowell & Moring LLP

(57) ABSTRACT

An apparatus and method of determining the level of a liquid in a reservoir having curved surfaces is described, where the measuring device comprises a support having a radius of curvature conformable to the curvature of the reservoir. A float assembly is captivated to the support so that it may move freely in the vertical direction, but is constrained in rotation with respect to the support by compatible asymmetrical structural features. The float assembly includes an element that can be sensed by a sensor assembly that is positioned along the support over the length of the support encompassing the range of fluid levels to be measured.

20 Claims, 6 Drawing Sheets

(56) References Cited

U.S. PATENT DOCUMENTS

| | | |
|---|---|---|
| 2011/0010069 A1 | 1/2011 | Payne et al. |
| 2017/0139170 A1* | 5/2017 | Stockwell ................ B01J 3/004 |
| 2017/0267411 A1 | 9/2017 | Beier et al. |
| 2018/0156654 A1* | 6/2018 | Roux ..................... H01H 36/02 |
| 2018/0245484 A1 | 8/2018 | Davis et al. |
| 2018/0321073 A1* | 11/2018 | Cleyet ................... B64D 37/04 |

* cited by examiner

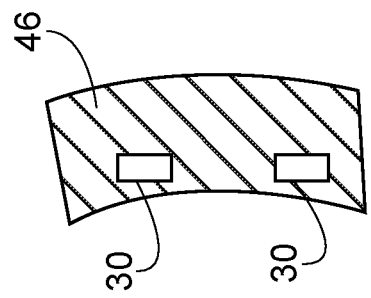
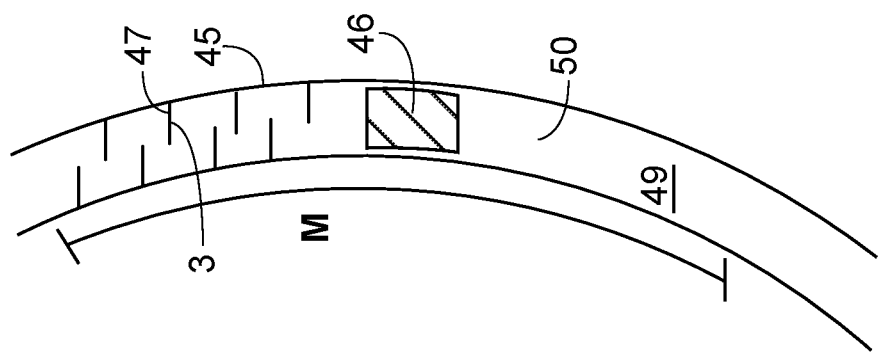
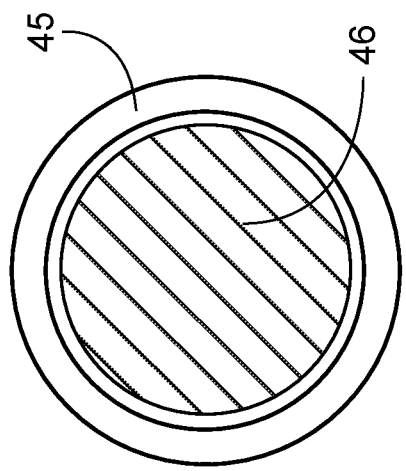
FIG.6C
FIG.6B
FIG.6A

OIL QUANTITY MEASUREMENT APPARATUS AND METHOD

TECHNICAL FIELD

This disclosure relates to the measurement of the level of a fluid in a vessel having an irregular shape.

BACKGROUND

Fluid containers may be used, for example, to supply oil to various components of an engine. To achieve the necessary fluid volume the containers may be formed in unconventional shapes so as to permit installation in confined and possibly inaccessible locations. A particular application is in a gas turbine engine.

Gas turbine engines may include a compressor, a combustor and a turbine. Typically, the compressor is an air compressor rotating on a longitudinal shaft of the engine to provide air for the combustion cycle. The air is provided to the combustor along with fuel where combustion occurs to create a high pressure, high temperature flow, which is provided to the turbine. The turbine may provide mechanical torque to the shaft and provides exhaust gas that creates thrust. The gas turbine engine typically includes bearings, such as shaft bearings that allow the shaft to rotate. Such bearings may be lubricated by bearing oil. The bearing oil may be distributed to one or more bearings from an oil sump(s). Seals may be used to stop leaking of the bearing oil around the shaft or other rotating parts of the gas turbine engine. An oil scavenge system may return bearing oil to the oil sump(s).

The location of such an oil tank may be constrained by the geometry of the turbine and associated air guiding structures.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

FIG. 6A is a transverse cross-sectional view of another arcuate support adapted to guide a float having a compatible cross section and radius of curvature;

FIG. 6B is a transverse cross-sectional view of a float body having a cross section compatible with the arcuate support of FIG. 6A; and FIG. 6C is a longitudinal cross-sectional view of the float body of FIG. 6B where the radius of curvature conforms to the radius of curvature of the vertical support.

DETAILED DESCRIPTION

Figure 1:
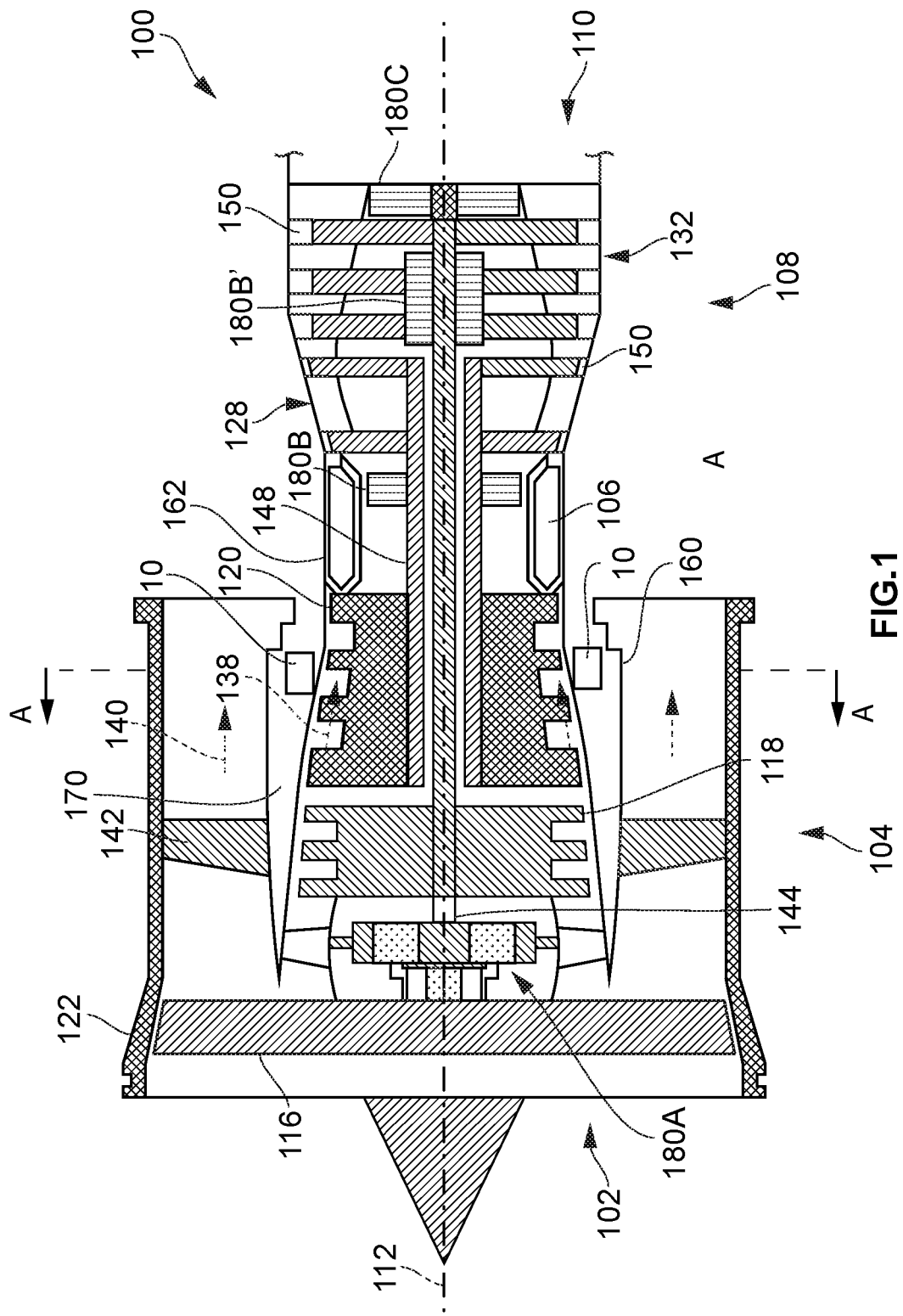
FIG. 1 illustrates a longitudinal cross-sectional view of an example of a gas turbine engine, with an example location of an oil reservoir.

In an example, the vessel may be an oil reservoir that is located between the fan duct and the outer housing of a compressor portion of a gas turbine engine. The location of the oil reservoir may be constrained by the other aspects of the engine design such that direct access to the oil reservoir is either difficult or not feasible without disassembly. However, oil may be added to the reservoir using a filler pipe or pressurized oil supply to make up for oil consumed during operation. To do this, the level of oil in the reservoir needs to be determined, and the oil re-supply operation should not result in overfilling of the reservoir.

The oil reservoir may be formed with a pair of arcuate opposing sides so as to increase the angular length of the oil reservoir when the reservoir is located, for example, to approximately conform with the radius of curvature of an interior portion of the engine assembly. The device used to measure the oil level over a significant portion of the volume of the oil reservoir may have an arcuate shape as well to permit a length dimension of the device to be incorporated into the oil reservoir without interference with the walls thereof. The oil reservoir also be known as an oil tank, or similar name. The use of a device as described herein is not limited to an oil tank, but may be used to measure a fluid level in any reservoir A curved oil level measuring device is described, substantially conforming to the to the curvature of the reservoir itself and comprises an arcuate support structure, a float adapted to be guided along the support structure, and an electrical fluid-quantity sensor based on determining the position of the float body along the support structure. One example of an electrical quantity to be measured is a magnetic field strength; another quantity that may be measured is capacitance. This device may permit the oil quantity to be measured either in-flight or on-the-ground over a desired range of fill levels so as to determine the rate of consumption of oil or other fluid and to monitor the filling or re-filling of the tank.

However desirable this remote measurement may be, conventionally, the servicing of the engine on the ground uses a sight glass mounted on a surface of the reservoir to visually determine the level of the oil or other fluid in the reservoir over a range of fill levels determined by the location and length of the sight glass. Often the sight glass permits observation of the fluid level in the region near the maximum fill level, and the servicing of the engine results in adding fluid when the sight glass indicates that a predetermined lower level has been reached or the fluid is not observed in the sight glass. When the fluid is introduced into the reservoir the sight glass may be used to monitor the filling process and enable personnel to terminate the process when an appropriate fill level is reached. While a sight glass may not be needed when the remote oil measuring device is used, user preference may make such a sight glass supplement a business consideration. Use of the sight glass may serve to reduce the precision of the measurement by the remote measurement in the measurement range near to the maximum fill level. Yet, the location of the oil reservoir may prevent such direct observation of fluid level by servicing personnel under some circumstances and all of the measurements may need to be performed remotely.

The oil reservoir may be provided with an electronic camera module and an associated light source and mounted to the oil reservoir or nearby engine structure so that an image of the sight glass may be remotely observed, for example, on an external servicing device through a communications channel. This communications channel may be any data communications channel having a suitable bandwidth and the channel may be shared with other sensors or controls. The detected level using the image may be analysed by a processor and also be used to control the operation of a remotely-controlled re-filling system. Image analysis may also be used to monitor or control a manual filling process.

FIG. 1 is a cross-sectional view of an example of a gas turbine engine 100. The gas turbine engine 100 may, for example, supply power to and/or provide propulsion of an aircraft. Examples of the aircraft may include a helicopter, an airplane, an unmanned space vehicle, a fixed wing vehicle, a variable wing vehicle, a rotary wing vehicle or the like. In other examples, the gas turbine engine 100 may be utilized in a configuration unrelated to an aircraft such as, for example, an industrial application, an energy application, a power plant, a pumping set, a marine application (for example, for naval propulsion), a weapon system, a security system, a perimeter defense or security system.

The gas turbine engine 100 may take a variety of forms in various embodiments. Although depicted in the example of FIG. 1 as a ducted axial-flow engine with multiple spools, in some forms the gas turbine engine 100 may have additional or fewer spools and/or may be a centrifugal or mixed centrifugal/axial flow engine. In some forms, the gas turbine engine 100 may be a turboprop, a turbofan, or a turboshaft engine. Furthermore, the gas turbine engine 100 may be an adaptive cycle and/or variable cycle engine. Other variations are also contemplated. Other engine types may also employ a fluid tank where remote quantity measurement is desired.

The gas turbine engine 100 may include an air intake 102, multistage axial-flow compressor 104, a combustor 106, a multistage turbine 108 and an exhaust 110 concentric with a central axis 112 of the gas turbine engine 100. The multi-stage axial-flow compressor 104 may include a fan 116, a low-pressure compressor 118 and a high-pressure compressor 120 disposed in a fan casing 122. The multistage turbine 108 may include a high pressure turbine 128 and a low pressure turbine 132.

A low-pressure spool includes the fan 116 and the low-pressure compressor 118 driving the low-pressure turbine 132 via a low-pressure shaft 144. A high-pressure spool includes the high-pressure compressor 120 driving the high-pressure turbine 128 via a high-pressure shaft 148. In the illustrated example, the low-pressure shaft 144 and the high pressure shaft 148 are disposed concentrically in the gas turbine engine 100. In other examples, other shaft configurations are possible.

During operation of the gas turbine engine 100, fluid received from the air intake 102, such as air, is accelerated by the fan 116 to produce two air flows. A first air flow, or core air flow, travels along a first flow path indicated by dashed arrow 138 in a core of the gas turbine engine 100. The core is formed by the multi-stage axial compressor 104, the combustor 106, the multi-stage turbine 108 and the exhaust 110. A second air flow, or bypass airflow, travels along a second flow path indicated by dashed arrow 140 outside the core of the gas turbine engine 100 past outer guide vanes 142.

The first air flow, or core air flow, may be compressed within the multi-stage axial compressor 104. The compressed fluid may then be mixed with fuel and the mixture may be burned in the combustor 106. The combustor 106 may include any suitable fuel injection and combustion mechanisms. The resultant hot, expanded high-pressure fluid may then pass through the multi-stage turbine 108 to extract energy from the fluid and cause the low-pressure shaft 144 and the high-pressure shaft 148 to rotate, which in turn drives the fan 116, the low-pressure compressor 118 and the high-pressure compressor 120. Discharge fluid may exit the exhaust 110.

The first air flow 138 and the second air flow 140 are coaxial and are confined and separated from each other by a structure comprising the fan casing 122 and an outer compressor case 160 and the outer case 162 of the multi-stage compressor 118,120. A void 170 may exist between the outer compressor case 160 and the outer case 162 where auxiliary equipment such as an oil reservoir 10, shown in cross section, may be provided, using this otherwise empty space.

Figure 2:
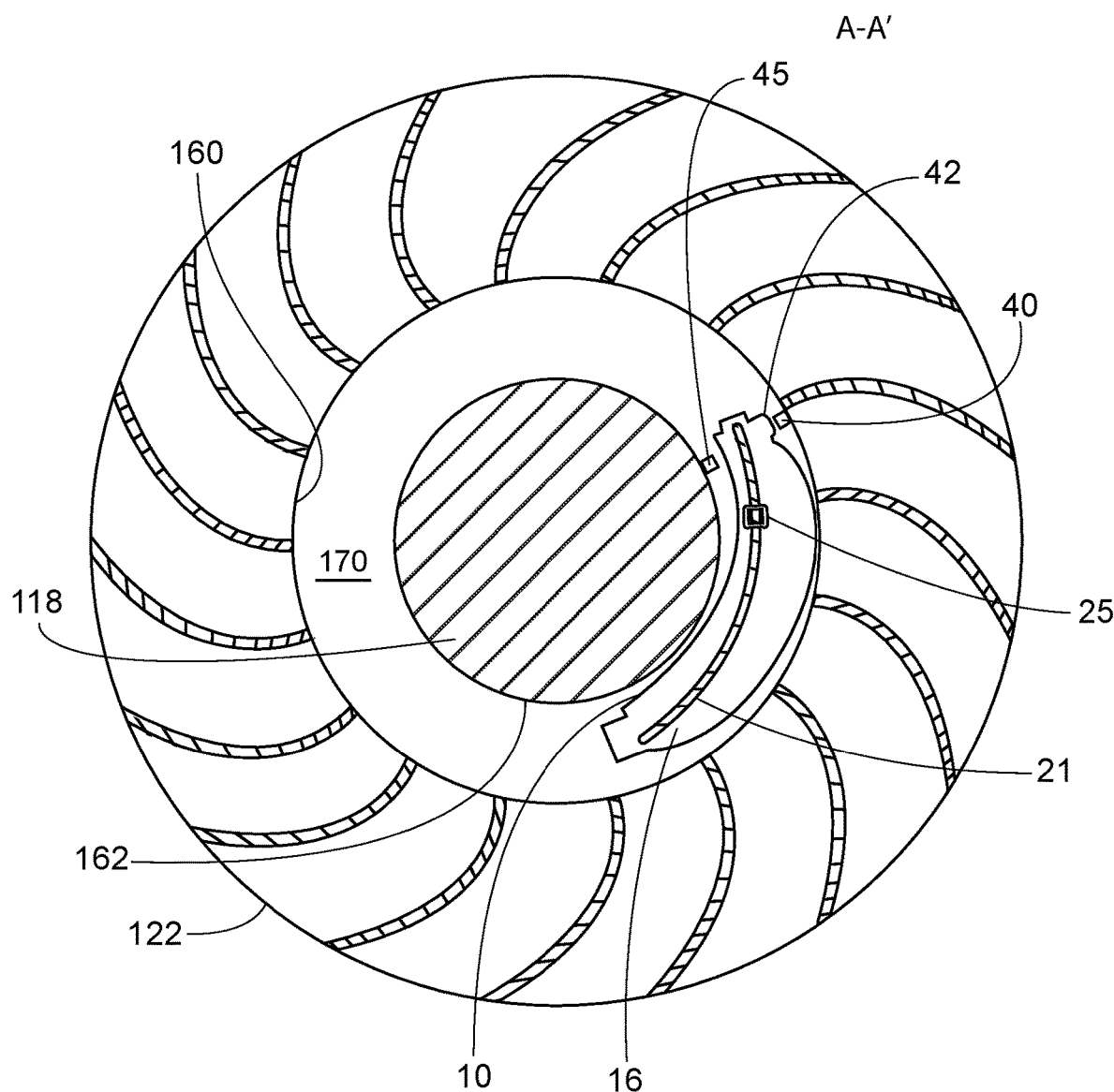
FIG. 2 is a simplified transverse cross-section view (looking forward) of a portion of an example gas turbine engine of FIG. 1 illustrating the example location of the oil reservoir.

In an aspect, FIG. 2 is a simplified cross-section transverse view (looking forward) of a portion of an example gas turbine engine, of which FIG. 1 is a non-limiting example) illustrating a the location of the oil reservoir 10 with respect to the outer compressor case 160 and the outer case 162 of the engine core, which may be a multi-stage compressor or high pressure turbine 118. In this example, the oil reservoir 10 is disposed along an arcuate side portion of the void 170 created by the walls 160 and 162. Details of the mounting arrangement are not shown as they depend on the engine-specific design. However, the oil reservoir 10 may be fixedly attached to a wall 160 or 162.

The reservoir 10 may comprise arcuate surfaces opposing the walls 160 and 162 where the radius of curvature of the walls of the reservoir are selected to conform to the general radius of curvature of the void 170, facilitating installation of a reservoir of a desired capacity in a confined space. The radius of curvature may vary as part of the detailed design of the oil reservoir 10, taking into account the required fluid volume, the shape of an oil measurement device, mounting and fluid feeding arrangements, the location of a sight glass 42 and any camera device 40.

The oil level sensor may comprise a float body assembly 22, captivated to an oil sensor assembly having an arcuate support structure 21 so that the float body, or float assembly 22 may slide freely along at least a portion of the length of the arcuate support structure 21, which may be attached to an inner wall 16 of the oil reservoir 10.

Figure 3:
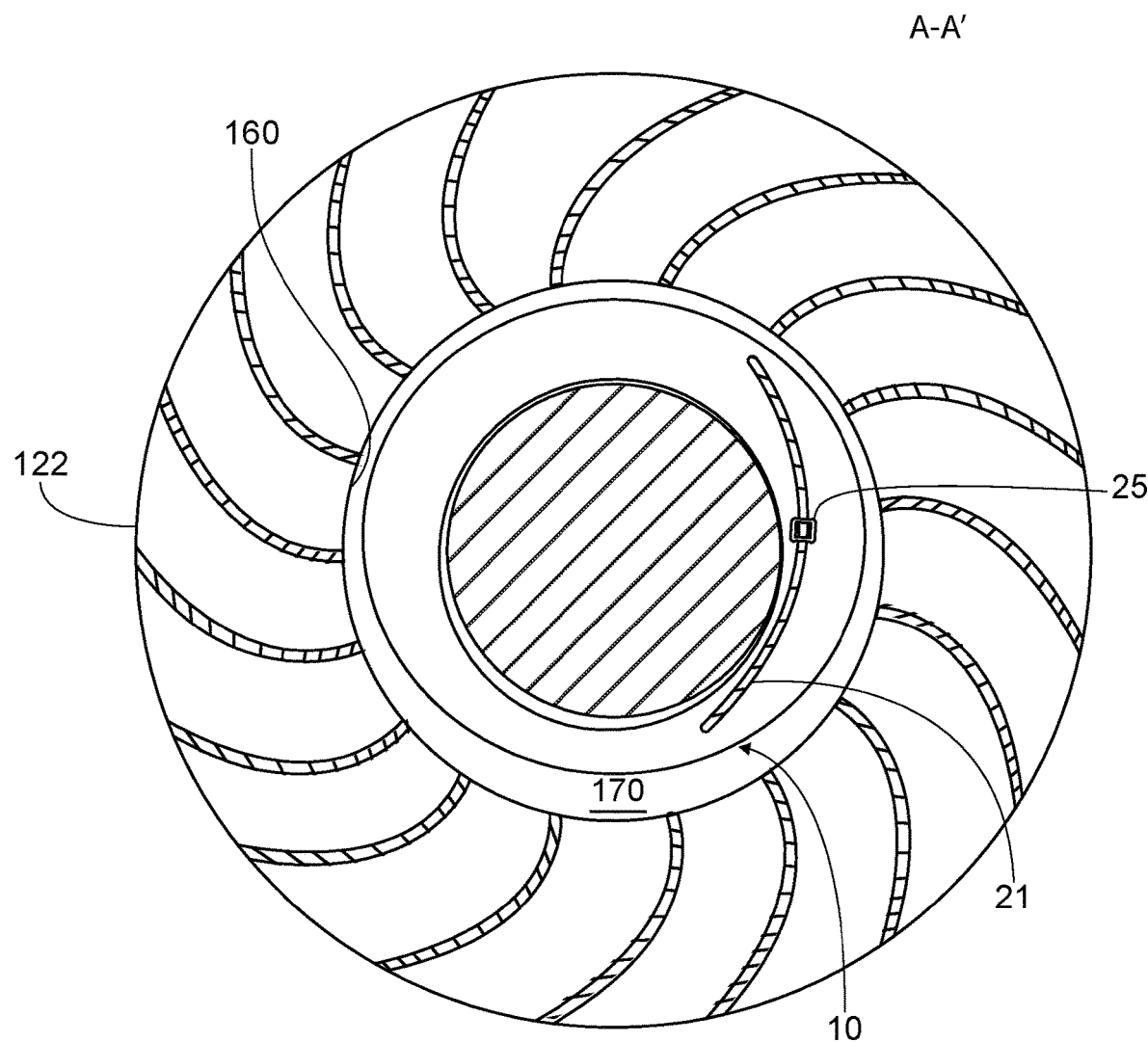
FIG. 3 is a simplified transverse cross-section view (looking forward) of a portion of an example gas turbine engine of FIG. 1 illustrating another example location of the oil reservoir.

In another aspect, FIG. 3 illustrates another arrangement of the oil reservoir 10 with respect to the main engine components. The oil reservoir 10 comprises at least an angular section of a generally toroidal shape with the radius of curvature of each of the walls generally conforming to the radius of curvature of the facing walls 160, 162 of the void 170. The oil sensor assembly is deployed on one of the generally vertical arms of the oil reservoir 10 and serves to measure the oil level on both sides of the oil reservoir 10, when in a level attitude. This arrangement may correspond to the location of the oil reservoir 10 shown in cross section in the example of FIG. 1.

Figure 4C:
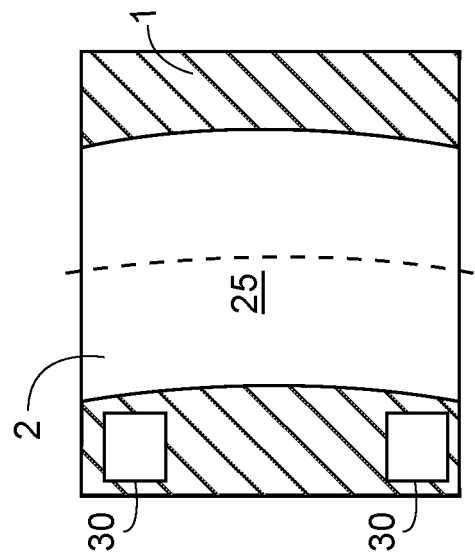
FIG. 4C is a longitudinal cross-sectional view of the float body of FIG. 4B where the radius of curvature conforms to the radius of curvature of the vertical support.
Figure 4B:
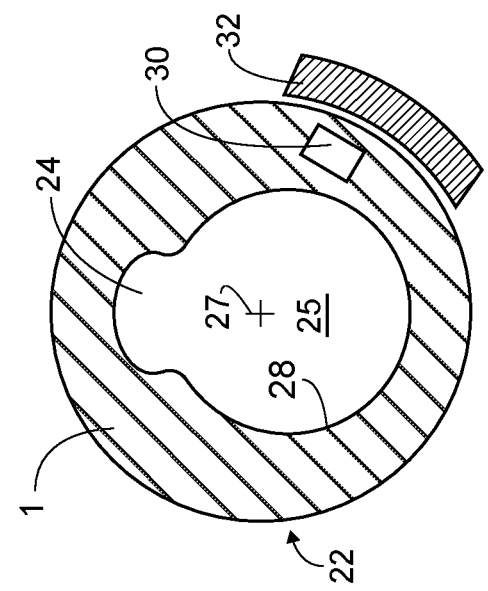
FIG. 4B is a transverse cross-sectional view of a float body having a cross section compatible with the support of FIG. 4A.
Figure 4A:
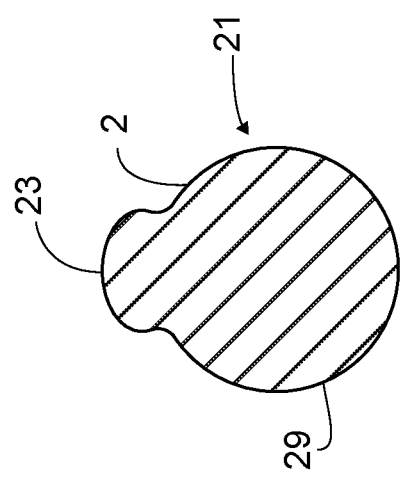
FIG. 4A is a transverse cross-sectional view of an arcuate vertical support adapted to guide a float having a compatible cross section and radius of curvature.

In an example, the oil measuring device which may be termed an oil gage, fluid-level sensor or the like, may be comprised of the central arcuate supporting structure 21, shown in cross section in FIG. 4A. The central arcuate supporting structure 21 may be a rod, a column or a beam which may be solid or hollow, and having a shape in cross section that cooperates with a similarly-shaped complimentary surface of a float 22 so as rotationally captivate the float 22 to the central supporting structure 21. As shown in FIG. 4A, the rod 21 has a protuberance or tongue 23 which renders the rod 21 rotationally asymmetric. FIG. 4B is an example of a cross section of a float 22 compatible with the rod 21, where the central opening 25 of the float 22 is sized and dimensioned to slide without binding to the rod 21 when moving in a direction parallel to the axis of the rod 21. A gap between the inner surface of the central opening 25 and the outer surface 29 of the rod 21 is sized to permit fluid to penetrate the gap to provide lubrication. The gap may be selected to minimize the effects of the fluid viscosity or meniscus forces.

The central axis 27 of the float has a radius of curvature determined by that of the rod 21 so that, the float 22 may move vertically in the oil reservoir 10 along the rod 21 without binding. The float 22 may be a solid body fabricated from a suitable plastic, or similar substance or a hollow structure fabricated from a metal such as aluminium, steel or titanium, or the like, that has an effective specific gravity that is less than that of the liquid to be measured, such that a top surface of the float 22 protrudes above that of the corresponding liquid. The length of the float 22 is selected to contain the element that may be sensed to determine the position of the float 22 along the rod 21, and is sufficient to provide the needed buoyancy.

In an aspect, one or more permanent magnets 30 may be mounted or embedded within the float 22 and positioned such that a pole of each magnet opposes a plurality of magnetic sensor elements disposed along at least a portion of the length of the rod 21. The magnetic sensing elements may be in a structure 32 that lies outside the periphery of the float 22, or is inside the rod 21 or on the surface 29 thereof. When the sensing elements are disposed in a structure outside of the surface 29 of the float 22, on an arcuate structure 32 generally conforming to the rod, a spacing sufficient to avoid binding or deleterious viscous effects is selected. Since the magnetic sensor does not need to be in contact with the magnet, this spacing is a matter of design, taking account of the magnet strength. Only a single magnet may be used, or multiple magnets may be used, depending on the specific design of the magnetic sensor elements and their spacing along the length of the float.

So long as the inner surface 28 of the float 22 and the outer surface of the rod 21 conform sufficiently such that a float 22 does not bind to the rod 21, the specific details of this aspect of the device may be selected based on other considerations, such as ease of mounting of the structure 32 comprising the sensing portion of the device and the rod 21. The cross-section of the central opening 25 in the float 22 may be a tongue 24 as shown, an oval, a rectangle, a square or the like. Further, the upper 2 and lower extremities of the central opening 25 may be relieved with respect to the rod 21 so as to minimize frictional forces.

Figure 5C:
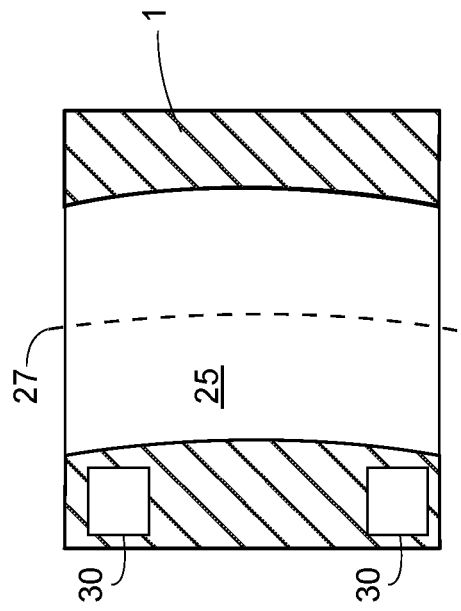
FIG. 5C is a longitudinal cross-sectional view of the float body of FIG. 5B where the radius of curvature conforms to the radius of curvature of the vertical support.
Figure 5B:
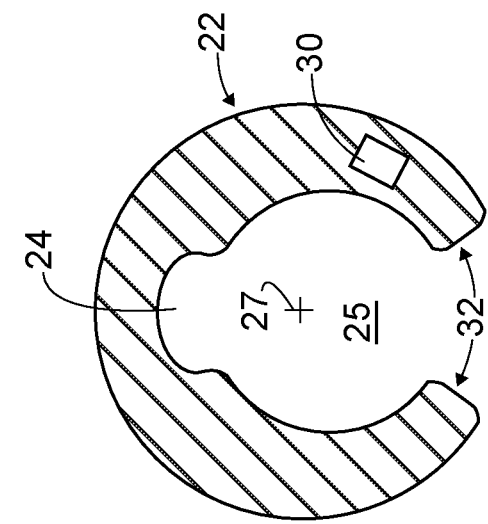
FIG. 5B is a transverse cross-sectional view of a float body having a cross section compatible with the arcuate support of FIG. 5A.
Figure 5A:
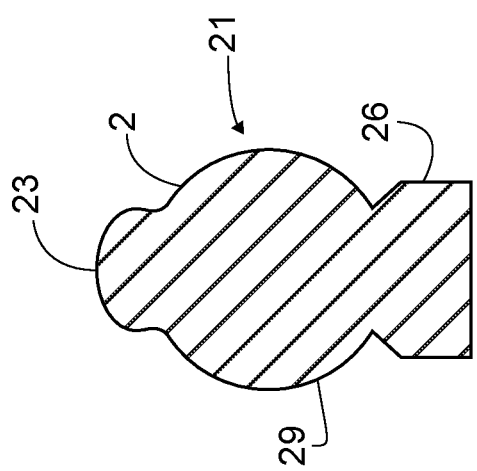
FIG. 5A is a transverse cross-sectional view of another arcuate support adapted to guide a float having a compatible cross section and radius of curvature.

In another aspect, the rod 21 may have another protruding surface that extends along the length of the rod as a continuous structure 26 as shown in cross-section in FIG. 5A, or as separate protuberances spaced apart along the length thereof so as to provide mounting points connecting between the rod 21 and an inner surface of the oil reservoir 10. The functions of the tongue 23 and the protruding surface 26 may be combined in another example.

When the rod 21 has a form such as shown in FIG. 5A, the central opening 25 in the float 22 can be relieved to form an aperture 32 conforming to that of a portion the continuous structure 26, as shown in FIG. 5B. A spacing between the aperture 32 and the surface of the continuous structure 26 is selected to permit the float 22 to move freely in the vertical direction. The elevation view FIG. 5C has been rotated by 90 degrees so as to better illustrate the arrangement of the aperture 32.

In yet another example, FIG. 6, the support structure may be a rod, hollow column 45, or the like, having an arcuate longitudinal shape consistent with the inner dimensions of the oil reservoir 10 over at least a range M over which the oil level is to be measured, and the rod 45 may have a central aperture or cavity 49 running along the length thereof that is suitable for receiving a float 46, the float having a shape conforming to that of the cavity 49 in the column 45 and permitting the float 46 to move freely in a vertical direction along the length thereof. The outer surface of the rod 45 may be pierced by apertures formed therein, either horizontally or vertically so as to facilitate fluid communication between the main volume of the oil reservoir 10 and the interior of the support rod 45. The rotation of the float 46 may be constrained by the curvature of the arcuate column 45, or float 46 and the arcuate column 45 may have compatibly distorted cross sections. The main body of the float 46 may have, for example, three equally spaced longitudinal ridges (not shown), facing the interior of the hollow column, cooperating with the gap to facilitate the sliding motion of the float 46 with respect to the support rod 45.

In each of the examples, constraining the float in a rotational direction may maintain a consistent spacing and orientation between the location of the magnet 30, or other aspect of the float element 46 to be sensed and the sensors on the sensor structure mounted to the arcuate column 45, or in close proximity thereto.

The float 22, 46 and the arcuate support 21, 45 may be fabricated from engineering materials that may be a plastic, metal or a composite thereof, with the selection being a matter of detail, which may take account of the technical characteristics of the float position sensor.

As shown in FIG. 2, in another example, a sight glass 42 may be additionally mounted in the wall of the of the oil reservoir 10 so as to permit viewing of the level of the fluid inside the oil reservoir 10 when the level is within the range of the sight class. Here, the sight glass 42 is located near a top portion of the oil reservoir to permit optically determining the level of the fluid when the oil reservoir 10 is nearly full. The sight glass may be similar to one obtainable from EATON Tedco, having a linear form factor where the sight glass transparent portion may be configured to enhance the contrast between the air and the liquid using refraction grooves, although other sight glasses may be satisfactorily used. Another supplier of suitable sight gauges is Parker Straroflex, Fort Worth, Tex. The glass portion of the sight glass 42 may be surrounded by a housing or bezel through which the fluid level may be viewed, and the bezel may have indicia such as FULL, ADD 1 QT, ADD 2 QTS, and so forth, to guide an operator in accurately topping up the fluid level in maintenance operations.

As the sight glass 42 may not be conveniently viewed directly by personnel or may be entirely inaccessible without significant disassembly of the engine or other structures, a camera such as a Librestream Onsight Cube-EX brand camera, or similar product may be employed. Cameras of this type provide video output over a communications channel and may have an integral light source that may be activated when digital images are being collected. Use of this remotely viewable level measurement technique is normally in conjunction with static measurements and facilitates ground servicing where precision is needed when the fluid level is approaching the maximum capacity of the oil reservoir, and to confirm the fill level. The measurement may be more finely graduated than that obtained by the remote electrical oil level measurement assembly, reducing the cost thereof. The remote oil level measurement assembly\ may be used during operation of the engine, which may be, for example in-flight monitoring and replenishment of the oil using, for example, a pressurized supply from a tank remotely located from the engine. Such operations need not fully replenish the oil level, yet may adequately perform a function of ensuring a continuous supply of oil to the engine.

The output of the level sensing gauge may be transmitted through the aircraft internal communications system for use in on-board diagnostics and control of automatic replenishment if such a capability is provided, or by a low power wireless communications system such as WiFi for use by ground personnel.

The position of the float 22, 46 along the length of the supporting structure 21 may be sensed by magnetic techniques as discussed above. The magnetic sensors may be either physical magnetic switches or Hall-effect devices positioned along a structure 32 oriented parallel to the side of the float containing the magnet 30. In another aspect, the sensing structure may be disposed inside the support rod 21 where the float 22 is disposed outside the support rod 21, or outside the support rod 21 where the float 22 is located within a hollow support 21. In each situation, the sensitive magnetic switch elements are disposed to face directly opposing the position of the magnet 30 when the float 22 is at the vertical level of the particular sensing element. When the magnetic field is detected by the Hall-effect sensor or switch, for example, the circuit is closed for that switch and the corresponding level is indicated. Where a plurality of magnets 30, spaced vertically apart is used, the spacing may permit an increase in spacing of the magnetic sensing elements when the vertical spacing between the two magnets is greater than the vertical gap between the sensors. The control and communications aspects of this sensor may be performed by a microprocessor executing instructions stored in a non-volatile computer readable memory.

In another example of sensing the level of the float in the liquid, a capacitive sensor assembly may be used. This may be facilitated by mounting one or more metal elements on or near the surface of the vertical portion of the float so as to change the capacitance of capacitors incorporated into the structure 35. The electronic elements needed may be provided on the circuit board forming the capacitors.

In yet another aspect, the structure may include optical proximity sensors and the float may have a reflective element as part of the float disposed so that the proximity sensors and the float oppose each other along the length of the structure 35.

In other examples, other structures, geometries and/or configurations may be present, such as flanges, lips, fins, flow channels, walls, ridges, and the like to facilitate installation of the oil measuring device or its components.

The subject-matter of the disclosure may also relate, among others, to the following:

1. In an aspect, a system comprising:
   a fluid reservoir system, comprising:
   a liquid-tight enclosure having at least two opposing arcuate surfaces;
   a device to measure a level of a liquid present in the liquid-tight enclosure, the device comprising:
   an arcuate structure disposed within the liquid-tight enclosure, having a radius of curvature along a length thereof, and extending from a first location proximal to a top end of enclosure to a second location proximal to a bottom end of the enclosure, the arcuate structure having an asymmetrical cross section;
   a float having a specific gravity less than that of the liquid, the float comprising:
   a float body whose axis conforms to the radius of curvature of the axis of the arcuate support and an aperture extending through the float body and conforming to at least a portion of the asymmetrical cross section of the arcuate structure;
   a sensor element,
   wherein the float body is sized and dimensioned to be spaced apart from the arcuate structure and to slidably engage therewith; and
   a sensor assembly disposed and oriented so that the sensor assembly determines a position of the sensor element along a length of the arcuate structure.

2. The system of aspect 1, wherein the radius of curvature of the opposing arcuate surfaces of the liquid-tight enclosure is selected to permit installation of the system in association with an engine.

3. The system of aspect 1, wherein the liquid-tight enclosure is a toroidal shape or an angular section of the toroidal shape.

4. The system of aspect 1, wherein a first radius of curvature of a first arcuate surface of the arcuate surfaces of the liquid-tight enclosure conforms to a radius of curvature of an outer limiting surface of a volume in which the liquid-tight enclosure is located and a second radius of curvature of a second arcuate surface of the arcuate surfaces of the liquid-tight enclosure conforms to a radius of curvature of an inner limiting surface of the volume in which the liquid-tight enclosure is located and the radius of curvature of the arcuate structure is intermediate between the first radius of curvature and the second radius of curvature.

5. The system of aspect 1, wherein the arcuate structure further comprises:
   a rotationally cylindrical aperture having an asymmetrical modification.

6. The system of aspect 5, wherein the asymmetrical modification is a ridge formed along an outer surface of the arcuate structure.

7. The system of aspect 5, wherein the float body further comprises:
   a main structure having an aperture extending from a top surface to a bottom surface thereof, coaxial with the axis of symmetry of the float body; and,
   a slot formed from an outer surface of the main structure to an outer surface of the aperture thereof, the slot having a width conforming to that of at least a portion of the asymmetrical modification of the arcuate structure, such that the main structure is captivated to the arcuate structure and can slide freely along at least a portion of a length of the arcuate structure.

8. The system of aspect 5, wherein the arcuate structure has a void extending along a length thereof sized and dimensioned to accommodate a sensor assembly.

9. The system of aspect 8, wherein the main structure has three equally spaced ridges along a surface of the aperture of the float body acting as spacers to position the float body so that the float body may slide freely along the axis of the arcuate support.

10. The system of aspect 1, wherein the asymmetrical arcuate structure is a hollow column with a slot extending along a length thereof, the float body has a ridge along a length thereof, a width of the ridge and a thickness of the slot dimensioned such that the float body, when inserted in the hollow column, is rotationally captivated in the hollow column.

11. The system of aspect 1, wherein the sensor element is a permanent magnet embedded in the body.

12. The system of aspect 11, wherein the sensor assembly comprises a plurality of magnetic sensors disposed along a length thereof and positioned to come into proximity with the permanent magnet as the float body moves along the arcuate structure.

13. The system of aspect 12, wherein the sensor is arranged along a portion of a length of the arcuate structure.

14. The system of aspect 13, wherein the magnetically sensitive elements are Hall-effect sensors.

15. The system of aspect 14, further comprising:
a microprocessor adapted to determine a status of each Hall effect sensor and to communicate a location of Hall-effect sensor detecting a magnetic field of the permanent magnet over a communications channel.

16. The system of aspect 1, further comprising:
a sight glass positioned in a wall of the liquid-tight enclosure proximal to a predetermined maximum fill level;
a digital camera disposed to view the sight glass; and
a light source.

17. In yet another aspect, a method of measuring the level of liquid in a container having an arcuate shape comprises:
providing an arcuate support, conforming to a radius of curvature of the container so that the arcuate support extends further along a height direction than a linear support, wherein the arcuate support has an asymmetrical cross-section;
providing a float assembly having an aperture conforming to at least a portion of the asymmetrical cross-section of the arcuate support and spaced apart from the arcuate support so that the float assembly moves freely with respect to the arcuate support conforming to the height of a fluid in the container, wherein the float assembly has an element to be sensed;
providing a sensing assembly positioned to determine a location of the float assembly along length of the arcuate support by sensing the element to be sensed; and
determining the location of the float assembly.

18. The method of aspect 17, further comprising:
reporting the determined location of the float assembly to a remotely located position over a communications channel.

19. The method of aspect 17, further comprising:
providing a sight glass embedded in a wall of the container proximal to a predetermined maximum fill level;

20. The method of aspect 19, further comprising:
obtaining an image of the sight glass with a digital camera and transmitting the image over a communications channel.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

What is claimed is:
1. A system comprising:
a fluid reservoir system, comprising:
a liquid-tight enclosure having at least two opposing arcuate surfaces;
a device to measure a level of a liquid present in the liquid-tight enclosure, the device comprising:
an arcuate structure disposed within the liquid-tight enclosure and having a radius of curvature along a length thereof, and extending from a first location proximal to a top end of enclosure to a second location proximal to a bottom end of the enclosure, the arcuate structure having an asymmetrical cross section;
a float having a specific gravity less than that of the liquid, the float comprising:
a float body whose central axis conforms to the radius of curvature of the arcuate structure
a sensor element,
wherein the float body is sized and dimensioned to be spaced apart from the arcuate structure and to slidably engage therewith; and
a sensor assembly disposed and oriented so that the sensor assembly determines a position of the sensor element along the length of the arcuate structure.

2. The system of claim 1, wherein the radius of curvature of each one of the two opposing arcuate surfaces of the liquid-tight enclosure is selected to permit installation of the system in association with an engine.

3. The system of claim 1, wherein the liquid-tight enclosure is a toroidal shape or an angular section of the toroidal shape.

4. The system of claim 1, wherein a first radius of curvature of a first arcuate surface of the two opposing arcuate surfaces of the liquid-tight enclosure conforms to a radius of curvature of an outer limiting surface of a volume in which the liquid-tight enclosure is located and a second radius of curvature of a second arcuate surface of the two opposing arcuate surfaces of the liquid-tight enclosure conforms to a radius of curvature of an inner limiting surface of the volume in which the liquid-tight enclosure is located and the radius of curvature of the arcuate structure is intermediate between the first radius of curvature and the second radius of curvature.

5. The system of claim 1, wherein the arcuate structure further comprises:
a rotationally cylindrical aperture having an asymmetrical modification.

6. The system of claim 5, wherein the asymmetrical modification is a ridge formed along an outer surface of the arcuate structure.

7. The system of claim 5, wherein the float body further comprises:
a main structure having an aperture extending from a top surface to a bottom surface thereof, coaxial with an axis of symmetry of the float body and conforming to at least a portion of the asymmetrical cross section of the arcuate structure; and
a slot formed from an outer surface of the main structure to an outer surface of the aperture thereof, the slot having a width conforming to that of at least a portion of the asymmetrical modification of the rotationally symmetric arcuate structure, such that the main structure is captivated to the arcuate structure and can slide freely along at least a portion of the length of the arcuate structure.

8. The system of claim 7, wherein the main structure has a plurality of spaced ridges spaced apart along a surface of the aperture of the float body acting as spacers to position the float body so that the float body may slide freely along the length of the arcuate structure.

9. The system of claim 5, wherein the arcuate structure has a void extending along a length thereof, the void sized and dimensioned to accommodate the sensor assembly.

10. The system of claim 1, wherein the arcuate structure comprises a hollow column with a slot extending along a length thereof, the float body includes a ridge along a length of the float body, a width of the ridge and a thickness of the slot dimensioned such that the float body, when inserted in the hollow column, is rotationally captivated in the hollow column.

11. The system of claim 1, wherein the sensor element is a permanent magnet embedded in the float body.

12. The system of claim 11, wherein the sensor assembly comprises a plurality of magnetic sensors disposed along a length thereof and positioned to come into proximity with the permanent magnet as the float body moves along the arcuate structure.

13. The system of claim 12, wherein the sensor assembly is arranged along a portion of a length of the arcuate structure.

14. The system of claim 13, wherein the magnetically sensitive elements are Hall-effect sensors.

15. The system of claim 14, further comprising:
a microprocessor adapted to determine a status of each Hall effect sensor and to communicate over a communications channel a location of a Hall-effect sensor detecting a magnetic field of the permanent magnet.

16. The system of claim 1, further comprising:
a sight glass positioned in a wall of the liquid-tight enclosure proximal to a predetermined maximum fill level;
a digital camera disposed to view the sight glass; and
a light source disposed to emit light toward the sight glass.

17. A method of measuring a level of liquid in a container, the method comprising:
providing an arcuate support, conforming to a radius of curvature of an arcuate shape of the container so that the arcuate support extends further along a height direction than a linear support, wherein the arcuate support has an asymmetrical cross-section;
providing a float assembly having an aperture conforming to at least a portion of the asymmetrical cross-section of the arcuate support and spaced apart from the arcuate support so that the float assembly moves freely with respect to the arcuate support conforming to a level of a fluid in the container, wherein the float assembly has an element to be sensed, wherein the float assembly has a float body whose central axis conforms to the radius of curvature of the arcuate structure;
providing a sensing assembly positioned to determine a location of the float assembly along a length of the arcuate support by sensing the element to be sensed; and
indicating a determined location of the float assembly.

18. The method of claim 17, further comprising:
communicating the determined location of the float assembly to a remotely located position over a communications channel.

19. The method of claim 17, further comprising:
providing a sight glass embedded in a wall of the container proximal to a predetermined maximum fill level.

20. The method of claim 19, further comprising:
obtaining an image of the sight glass with a digital camera and transmitting the image over a communications channel.

* * * * *